(12) United States Patent
Kordahi

(10) Patent No.: US 7,278,789 B2
(45) Date of Patent: Oct. 9, 2007

(54) UNDERSEA EQUIPMENT HOUSING WITH MOLDED TERMINATIONS

(75) Inventor: Maurice E. Kordahi, Atlantic Highlands, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 11/221,572

(22) Filed: Sep. 8, 2005

(65) Prior Publication Data

US 2007/0053645 A1    Mar. 8, 2007

(51) Int. Cl.
G02B 6/38    (2006.01)
G02B 6/00    (2006.01)

(52) U.S. Cl. .......................... 385/72; 385/56; 385/58; 385/75; 385/135

(58) Field of Classification Search ................. 385/70, 385/72, 73, 92–94, 135, 88, 147
See application file for complete search history.

(56) References Cited

U.S. PATENT DOCUMENTS

| | | | |
|---|---|---|---|
| 4,064,358 A | 12/1977 | Smith et al. | 174/70 |
| 4,172,212 A * | 10/1979 | Heinzer | 174/50 |
| 4,606,603 A * | 8/1986 | Cairns | 385/58 |
| 4,682,848 A * | 7/1987 | Cairns et al. | 385/69 |
| 4,757,157 A | 7/1988 | Pelet | 174/50 |
| 4,767,173 A * | 8/1988 | Priaroggia | 385/69 |
| 4,773,729 A * | 9/1988 | Mignien | 385/135 |
| 4,785,139 A | 11/1988 | Lynch et al. | 174/70 |
| 4,962,445 A | 10/1990 | Pelet et al. | 361/386 |
| 5,000,536 A | 3/1991 | Anderson et al. | 350/96.2 |
| 5,110,224 A | 5/1992 | Taylor et al. | 385/25 |
| 5,266,742 A | 11/1993 | Heier et al. | 174/93 |
| 6,028,974 A | 2/2000 | Shyu et al. | 385/100 |
| 6,088,502 A * | 7/2000 | Faist et al. | 385/134 |
| 6,381,394 B1 | 4/2002 | Cabrera et al. | 385/135 |
| 6,534,712 B1 * | 3/2003 | Pitrone et al. | 174/70 S |
| 6,571,042 B1 | 5/2003 | Kordahi | 385/100 |
| 6,950,229 B2 * | 9/2005 | Young et al. | 359/333 |
| 2002/0106168 A1 * | 8/2002 | Kordahi et al. | 385/100 |
| 2003/0002843 A1 | 1/2003 | Girzone et al. | 385/138 |
| 2004/0160663 A1 | 8/2004 | DeVincentis et al. | 359/333 |
| 2004/0175092 A1 | 9/2004 | Young et al. | 385/138 |
| 2005/0201709 A1 * | 9/2005 | DeVincentis et al. | 385/135 |

FOREIGN PATENT DOCUMENTS

EP    0389206    9/1990

(Continued)

OTHER PUBLICATIONS

EPO Search Report mailed Feb. 6, 2007 for related EPO application No. 06120266.9, 8 pages.

Primary Examiner—Michelle Connelly-Cushwa
Assistant Examiner—Rhonda S. Peace
(74) Attorney, Agent, or Firm—Grossman Tucker Perreault & Pfleger, PLLC

(57) ABSTRACT

An undersea equipment housing includes an inner housing, molded terminations secured at each end of the inner housing, and an outer strength housing. In one embodiment, the housing is used to house optical and electrical equipment, for example, in a repeater. The undersea equipment housing may also include a molded portion around an inside of the inner housing. The molded portion and the molded terminations provide voltage isolation.

17 Claims, 1 Drawing Sheet

FOREIGN PATENT DOCUMENTS

| | | |
|---|---|---|
| GB | 742837 | 1/1956 |
| GB | 870743 | 6/1961 |
| GB | 2145580 | 3/1985 |
| JP | 60068302 | 4/1985 |
| JP | 02250278 | 10/1990 |
| JP | 04101102 | 4/1992 |
| JP | 07231283 | 8/1995 |

* cited by examiner

UNDERSEA EQUIPMENT HOUSING WITH MOLDED TERMINATIONS

TECHNICAL FIELD

The present invention relates to undersea equipment housings and more particularly, to an undersea equipment housing including molded terminations.

BACKGROUND INFORMATION

Repeaters are commonly used in undersea fiber optic systems to amplify optical signals being transmitted over long distances. A repeater housing houses the optical and electronic equipment used to amplify the optical signals and is coupled to a fiber optic cable at each end. Repeaters currently used in undersea fiber optic systems may accommodate four to eight fiber pairs, requiring four to eight amplifier pairs to amplify the optical signals in each of the fibers.

The repeater housing is designed to have certain characteristics for use in an undersea environment. For example, the housing should have strength characteristics designed to withstand the stresses caused by the undersea environment. The repeater should also provide voltage isolation between the cable ends and the optical and electronic equipment. The optical and electronic equipment housed in the repeater should also be maintained under dry conditions, for example, to prevent "arcing." In one type of repeater, fibers are routed through a plastic tube (sometimes referred to as a "pigtail") on the outside of the repeater housing and a compressible stopper may be used to seal the plastic tube at the repeater wall where the fibers enter the repeater.

Conventional repeater bodies have increased in size due to increases in the number of fibers and optical and electrical equipment needed to meet demands for greater transmission capacity. Larger repeater bodies, however, present problems when transporting, storing and deploying the repeater bodies. Due to the complexity of the conventional repeater designs and the extreme requirements imposed on repeaters, conventional repeaters are also difficult to assemble and require a long time to manufacture.

Accordingly, there is a need for an undersea equipment housing capable of reducing the size of a repeater and capable of providing voltage isolation, sealing and strength characteristics desired in an undersea environment.

BRIEF DESCRIPTION OF THE DRAWINGS

These and other features and advantages will be better understood by reading the following detailed description, taken together with the drawings wherein.

DETAILED DESCRIPTION

Figure 1:
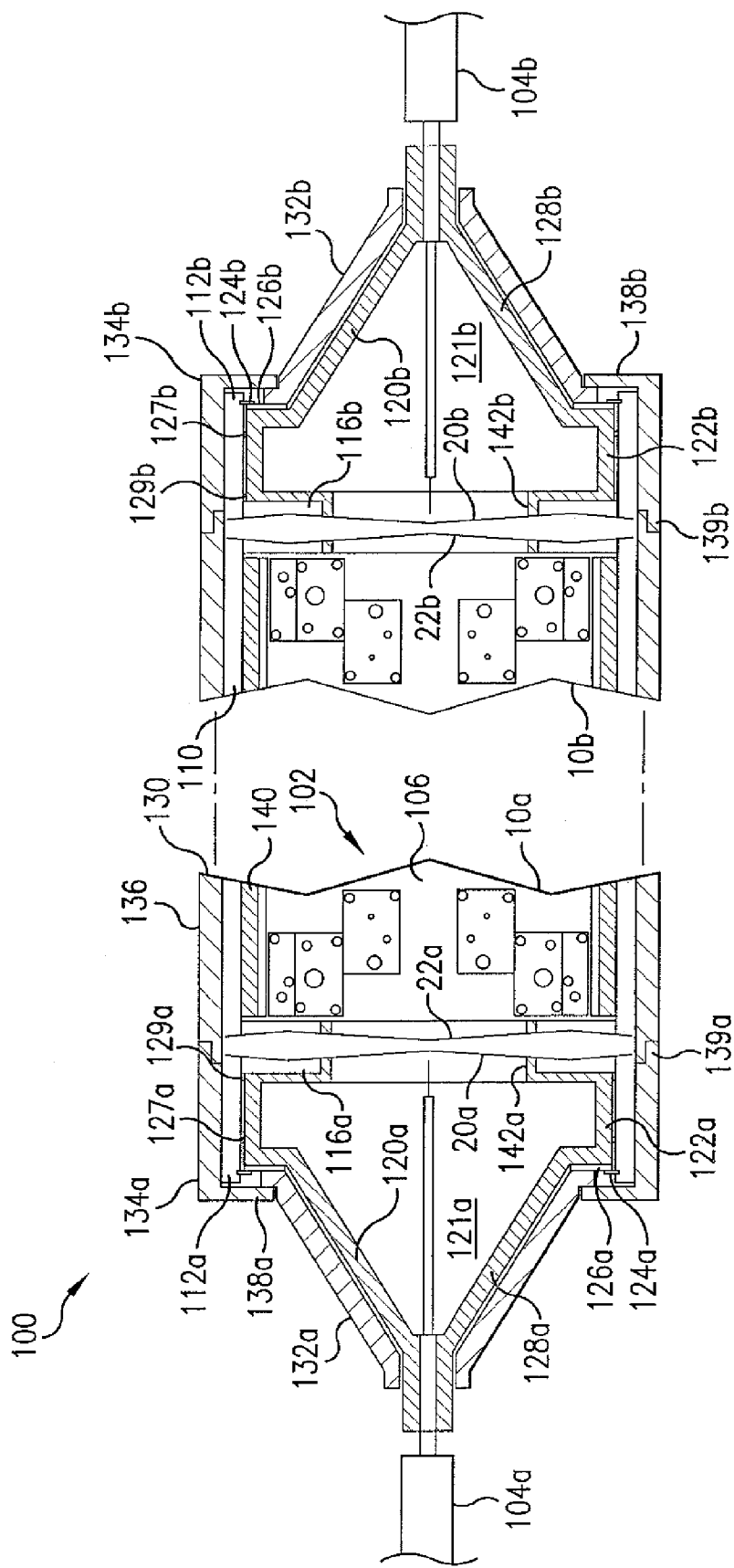
FIG. 1 is a cross-sectional view of an undersea equipment housing, consistent with one embodiment of the present invention.

Referring to FIG. 1, an undersea equipment housing 100 with molded terminations, consistent with one embodiment of the present invention, is used to house equipment 102, such as optical and/or electrical equipment, in an undersea environment. The exemplary embodiment of the housing 100 is shown with break lines 10a, 10b indicating that the housing 100 may vary in size. The undersea equipment housing 100 may be connected between undersea fiber optic cables 104a, 104b. In the exemplary embodiment, the undersea equipment housing 100 is used to house optical and electrical equipment 102 such as optical amplifiers in a repeater. Those skilled in the art will recognize that the undersea equipment housing 100 may also be used to house other types of equipment such as splices in a cable joint.

The undersea equipment housing 100 includes an inner housing 110, first and second molded terminations 120a, 120b and an outer strength housing 130. The inner housing 110 has first and second ends 112a, 112b and may be generally cylindrical in shape. The inner housing 110 may be made of a metallic material, such as steel. The inner housing 110 houses the optical and electrical equipment 102, which may be secured to a shelf 106. In the illustrated embodiment, annular rings 116a, 116b extend inwardly from the inner housing 110, and the shelf 106 with optical and electrical equipment 102 is positioned between the annular rings 116a, 116b. The inside of the housing 100 is also shown with break lines 20a, 22a and 20b, 22b, indicating that the length of this area inside of the housing 100 may also vary.

First and second molded terminations 120a, 120b are connected to the first and second ends 112a, 112b of the inner housing 110. The molded terminations 120a, 120b may include cable terminating structures 121a, 121b that are overmolded with a dielectric material such as polyethylene using techniques known to those skilled in the art. The cable terminating structures 121a, 121b may receive and terminate the ends of cables 104a, 104b using cable termination arrangements known to those skilled in the art. For example, the cables 104a, 104b may include strength members (not shown), which are secured to the cable terminating structures 121a, 121b.

The molded terminations 120a, 120b may include inside portions 122a, 122b that are located inside of the respective first and second ends 112a, 112b of the inner housing 110. In the illustrated embodiment, the inside portions 122a, 122b are positioned against the respective annular rings 116a, 116b. Retaining rings 124a, 124b, 126a, 126b or other retaining structures may be used to secure the inside portions 122a, 122b against the respective annular rings 116a, 116b. The inside portions 122a, 122b may be sealed against the respective annular rings 116a, 116b, thereby hermetically sealing the inside of the housing 100. One or more sealing members 127a, 127b, 129a, 129b, such as O-rings, may also be positioned between the inside portions 122a, 122b of the molded terminations 120a, 120b, respectively, and the inside surface of the inner housing 110.

The molded terminations 120a, 120b may also include outside portions 128a, 128b extending outside of the inner housing 110. In the illustrated embodiment, the outside portions 128a, 128b are generally conically shaped conforming to the shape of the cable terminating structures 121a, 121b. Although the illustrated embodiment shows specific shapes and configurations, those skilled in the art will recognize that the molded terminations may have other shapes or configurations.

The molded terminations 120a, 120b advantageously provide voltage isolation between the terminated cable ends and the inner housing 110 and the outer strength housing 130. The undersea equipment housing 100 may also include a molded portion 140 positioned inside of the inner housing 110 and molded portions 142a, 142b positioned inside of the annular rings 116a, 116b. The molded portions 140, 142a, 142b may also be made of a dielectric material such as polyethylene and provide voltage isolation between the optical and electrical equipment 102 and the inner housing 110.

The outer strength housing 130 is located outside of the inner housing 110 and the molded terminations 120a, 120b and may also be generally cylindrical in shape. The outer strength housing 130 may be made of a metallic material such as steel and may be designed to have the desired strength characteristics. The outer strength housing 130 may include multiple strength housing pieces that are secured together, for example, outside pieces 132a, 132b, end pieces 134a, 134b and one or more intermediate pieces 136. The end pieces 134a, 134b may include engaging portions 138a, 138b that extend over the ends 112a, 112b of the inner housing 110 and engage the outside pieces 132a, 132b of the strength housing 130. The end pieces 134a, 134b maybe threaded, at the other ends 139a, 139b, to the intermediate piece 136. The end pieces 134a, 134b may also be pinned or compressed and held together by other means. In the illustrated embodiment, the outer strength housing 130 is designed to provide protection and to secure the housing from cable tension. Although the illustrated embodiment shows a five piece structure having a particular shape and configuration, those skilled in the art will recognize that the strength housing may have other shapes and configurations.

The design of the undersea equipment housing 100 allows certain components in conventional repeaters to be eliminated, thereby reducing the size of the repeater. The design of the undersea equipment housing 100 can also be varied in size easily, for example, by varying the length of the inner housing 110 and strength housing 130.

To assemble the housing 100, the optical and electrical equipment 102 may be positioned within the inner housing 110, for example, between the annular rings 116a, 116b. The ends of the cables 104a, 104b may be secured to the molded terminations 120a, 120b with the outside pieces 132a, 132b positioned over the molded terminations 120a, 120b. The molded terminations 120a, 120b may then be positioned inside the respective ends 112a, 112b of the inner housing 110 and secured, for example, using the retaining rings 124a, 124b, 126a, 126b. The intermediate piece 136 of the strength housing 130 may be positioned over the inner housing 110. The end pieces 134a, 134b of the strength housing 130 may then be positioned over the outside pieces 132a, 132b and secured to the intermediate piece 136. Those skilled in the art will recognize that the steps for assembling the housing 100 may be performed in different sequences and additional steps may also be performed.

In summary, an undersea equipment housing, consistent with the present invention, includes an inner housing for housing optical and electronic equipment. First and second molded terminations are configured to be secured to respective first and second ends of the inner housing for receiving and terminating ends of a cable. At least a portion of each of the molded terminations is configured to be located inside of the respective first and second ends of the inner housing. An outer strength housing is configured to be located outside of the inner housing and the first and second molded terminations.

According to another embodiment, a repeater includes an inner housing having first and second ends and repeater optical and electrical equipment housed in the inner housing. First and second molded terminations are secured to respective first and second ends of the inner housing for receiving and terminating ends of a cable. An outer strength housing is located outside of the inner housing and the first and second molded terminations.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An undersea equipment housing comprising:
   an inner housing for housing optical and electronic equipment, said inner housing having first and second ends, wherein said inner housing includes first and second annular rings extending inwardly from and inside said inner housing, said first and second annular rings including surfaces facing said first and second ends of said inner housing, respectively;
   first and second molded terminations configured to be secured to respective said first and second ends of said inner housing for receiving and terminating ends of a cable, wherein at least a portion of said molded terminations includes a molded dielectric material and is configured to be located inside of respective said first and second ends of said inner housing, and wherein said first and second molded terminations are configured to be secured such that said at least a portion of said molded terminations including said molded dielectric material is sealed against said surfaces of said first and second annular rings, respectively; and
   an outer strength housing configured to be located outside of said inner housing and said first and second molded terminations, wherein said molded termination isolates voltage from said inner housing and said strength housing.

2. The undersea equipment housing of claim 1 said annular rings being configured such that said optical and electrical equipment is positioned between said rings.

3. The undersea equipment housing of claim 1 further including retaining rings configured to be coupled between said first and second ends of said inner housing and respective inside portions of said first and second molded terminations, wherein said retaining rings are configured to secure said inside portions of said first and second molded terminations against respective said first and second annular rings.

4. The undersea equipment housing of claim 1 further comprising a molded dielectric portion positioned inside of said inner housing.

5. The undersea equipment housing of claim 1 wherein said strength housing includes a plurality of strength housing pieces configured to be connected together.

6. The undersea equipment housing of claim 1 wherein said molded termination includes a cable terminating structure overmolded with a dielectric material.

7. The undersea equipment housing of claim 1 further comprising molded dielectric portions configured to be positioned inside of said annular rings.

8. The undersea equipment housing of claim 1 wherein said strength housing comprises:
   an intermediate piece configured to be positioned over an intermediate portion of said inner housing;
   first and second end pieces configured to be positioned over respective said first and second ends of said inner housing and configured to be coupled to said intermediate piece; and
   first and second outside pieces configured to be positioned over respective said first and second molded terminations and configured to be coupled to respective said first and second end pieces.

9. A repeater comprising:

an inner housing having first and second ends;

repeater optical and electrical equipment housed in said inner housing;

first and second molded terminations secured to respective said first and second ends of said inner housing for receiving and terminating ends of a cable, wherein at least a portion of said molded terminations is located inside of respective said first and second ends of said inner housing such that said molded terminations hermetically seal an inside of said inner housing, wherein said molded termination includes a cable terminating structure overmolded with a dielectric material; and an outer strength housing located outside of said inner housing and said first and second molded terminations, wherein said molded termination provides voltage isolation between said optical and electrical equipment and said inner housing and said strength housing.

10. The repeater of claim 9 wherein said inner housing includes first and second annular rings extending inwardly from said inner housing, said first and second annular rings including surfaces facing said first and second ends, respectively, and wherein said optical and electrical equipment is positioned between said annular rings.

11. The repeater of claim 10 wherein said first and second molded terminations are sealed against said surfaces of said first and second annular rings, respectively.

12. The repeater of claim 10 further including retaining rings coupled between said first and second ends of said inner housing and respective inside portions of said first and second molded terminations, wherein said retaining rings secure said inside portions of said first and second molded terminations against respective said surfaces of said first and second annular rings.

13. The repeater of claim 10 further comprising molded dielectric portions positioned inside of said annular rings.

14. The repeater of claim 9 further comprising a molded dielectric portion positioned inside of said inner housing.

15. The repeater of claim 9 wherein said strength housing includes a plurality of strength housing pieces connected together.

16. The repeater of claim 9 wherein said strength housing comprises:

an intermediate piece positioned over an intermediate portion of said inner housing;

first and second end pieces positioned over respective said first and second ends of said inner housing and coupled to said intermediate piece; and first and second outside pieces positioned over respective said first and second molded terminations and coupled to respective said first and second end pieces.

17. An undersea equipment housing comprising:

an inner housing for housing optical and electronic equipment, said inner housing having first and second ends, wherein said inner housing includes first and second annular rings extending inwardly from said inner housing, said first and second annular rings including surfaces facing said first and second ends of said inner housing, respectively;

first and second molded terminations configured to be secured to respective said first and second ends of said inner housing for receiving and terminating ends of a cable, wherein at least a portion of said molded terminations is configured to be located inside of respective said first and second ends of said inner housing, and wherein said first and second molded terminations are configured to be secured and sealed against said surfaces of said first and second annular rings, respectively;

retaining rings configured to be coupled between said first and second ends of said inner housing and respective inside portions of said first and second molded terminations, wherein said retaining rings are configured to secure said portions of said first and second molded terminations against respective said first and second annular rings; and an outer strength housing configured to be located outside of said inner housing and said first and second molded terminations, said strength housing comprising:

an intermediate piece configured to be positioned over an intermediate portion of said inner housing;

first and second end pieces configured to be positioned over respective said first and second ends of said inner housing and configured to be coupled to said intermediate piece; and first and second outside pieces configured to be positioned over respective said first and second molded terminations and configured to be coupled to respective said first and second end pieces.

\* \* \* \* \*